US012747094B1

(12) United States Patent
Bacon

(10) Patent No.: US 12,747,094 B1

(45) Date of Patent: Sep. 29, 2026

(54) WASTE COLLECTION SYSTEM AND METHOD FOR RECYCLING

(71) Applicant: Curtis B. Bacon, Englewood, CO (US)

(72) Inventor: Curtis B. Bacon, Englewood, CO (US)

(*) Notice: Subject to any disclaimer, the term of this patent is extended or adjusted under 35 U.S.C. 154(b) by 0 days.

(21) Appl. No.: 18/912,518

(22) Filed: Oct. 10, 2024

(51) Int. Cl.

*B65F 1/00* (2006.01)
*B65F 1/08* (2006.01)
*B65F 1/14* (2006.01)

(52) U.S. Cl.

CPC .............. *B65F 1/006* (2013.01); *B65F 1/085* (2013.01); *B65F 1/1452* (2013.01)

(58) Field of Classification Search

CPC ........ B65F 1/006; B65F 1/085; B65F 1/1452; B65F 1/1431; B65F 1/1436; B65D 7/24; B65D 19/12; B65D 19/16; B65D 19/0002; B65D 88/1687

See application file for complete search history.

(56) References Cited

U.S. PATENT DOCUMENTS 4,027,774 A * 6/1977 Cote .......................... B65F 1/06 229/117.34
4,664,347 A * 5/1987 Brown ...................... B65F 1/06 383/7
4,726,616 A * 2/1988 Schmidt .................. B65F 1/122 294/68.2
4,834,253 A * 5/1989 Crine ...................... B65F 1/085 220/909
5,098,250 A * 3/1992 Carson .................... B65F 1/004 414/421
5,158,198 A * 10/1992 Melideo ............... B65D 88/126 220/908
5,184,836 A * 2/1993 Andrews, Jr. ............. B62B 3/08 D9/425
5,360,311 A 11/1994 Lutz
5,425,456 A 6/1995 Erickson
6,702,135 B2 3/2004 Pickler
9,273,485 B2 * 3/2016 Goode .................... E04H 17/18
9,387,788 B1 7/2016 Stroup
9,573,756 B1 2/2017 Bennett
9,771,730 B2 9/2017 Matejka
9,878,846 B2 1/2018 Strom
10,046,909 B2 * 8/2018 Tullo ...................... B65F 1/141

(Continued)

FOREIGN PATENT DOCUMENTS

CA 3015395 A1 2/2020
CH 667062 A5 9/1988
DE 19721284 A1 11/1998

*Primary Examiner* — Kareen K Thomas

(74) *Attorney, Agent, or Firm* — Trendak IP Law LLC; Paul N Dunlap

(57) ABSTRACT

Systems and methods which provide a simplified, easy-to-use, and economical recycling system for collecting, sorting, transporting, and unloading multiple types of recyclables using bins adapted to fit inside a roll-off dumpster. The bins include lift sites which may be fork channels, fork stirrups, lift rings, or other means of lifting the bins in and out of the dumpster and/or dumping the bins. The lift sites are accessible over the top rail of the roll-off. The roll-offs and/or the bins may be modified to include bin location elements to prevent excessive movement of the bins in the roll-off. These bin location elements may be pins and complementary holes, or fins and slots, guide protrusions or the like. The bins may include lids, ladders, or steps and combinations thereof.

20 Claims, 6 Drawing Sheets

(56) References Cited

U.S. PATENT DOCUMENTS

| | | | | |
|---|---|---|---|---|
| 10,407,241 | B1 * | 9/2019 | Hipp | B30B 9/3042 |
| 10,835,927 | B2 | 11/2020 | Torriere | |
| 11,524,842 | B2 | 12/2022 | Sridhar | |
| 2008/0017645 | A1 * | 1/2008 | Garagiola | B65F 1/122 220/345.4 |
| 2015/0307273 | A1 * | 10/2015 | Lyman | B65F 1/1615 705/26.61 |
| 2018/0086186 | A1 | 3/2018 | Haag | |
| 2018/0148257 | A1 * | 5/2018 | Garagiola | B65F 1/02 |
| 2022/0044208 | A1 | 2/2022 | Borowski | |

* cited by examiner

WASTE COLLECTION SYSTEM AND METHOD FOR RECYCLING

BACKGROUND OF THE INVENTION

This invention relates generally to a system of extractable recycling bins for roll-off dumpsters adapted to facilitate and increase recycling without disrupting current waste streams, more particularly to simplify sorting and segregation of recyclables at the source, simplify transportation, and simplify unloading.

Rolloff dumpsters (also called "roll-offs" or "dumpsters" herein) are commonly used at sources that generate large amounts of solid waste such as construction sites and larger commercial sites. "Solid waste" includes waste which, although it has liquid content, is for practical purposes handled as solid. Typically, the materials being disposed of are intermingled and/or of mixed types (referred to in the industry as a mixed-box dumpster) making recycling difficult. Currently, none of the three largest waste management companies in the US that make up 75% of the market share sort materials from mixed-box dumpsters for recycling. Dumpsters are sized by cubic yards of material they can hold. Common sizes of roll-off dumpsters are 10, 15, 20, 30 and 40 cubic yards. These dumpsters take various common forms, as illustrated in FIGS. 1-4. Dumpster 14 in FIG. 4 is typical of square dumpsters. Dumpster 12 in FIG. 3 has sides that are angled inward near the base. Dumpster 10 in FIG. 2 has a front end that is angled rearward near the base. Dumpster 16 in FIG. 1 has sides and front end angled inward near the base. In each case, the dumpster may have wheels, rollers, or rails (not shown) to facilitate loading and unloading onto a transport vehicle such as a specially adapted trailer or truck. Each style of roll-off dumpster has a rear door or gate as shown. In this application, terms such as forward, front, rear, left, right, top, and bottom are generally used with respect to the dumpster oriented for transport on a truck.

Thirty-yard dumpsters are the most common size at construction sites, larger commercial sites and sites of large home remodeling projects. The trash and materials that could be recycled are intermixed and either transported directly to a landfill or transported to a transfer station where it is dumped for later transport to the landfill in even larger trucks. In spite of the known recycling approaches to be discussed next, recycling or sorting or separating almost never occurs for these mixed-box dumpsters due to the expense and difficulties involved.

In one known recycling approach, a materials recovery facility (MRF, pronounced "murf") can receive mixed waste comprising municipal solid waste (MSW) and separate recyclable materials from the mixed waste through a combination of manual and mechanical sorting. U.S. Pat. No. 10,835,927 to Torriere describes a system and process of sorting and recovering recyclable materials in such a stream. The system may have up to twelve steps, some of which can be split into multiple steps. Sorting and separating recyclables in a mixed stream clearly involves a lot of added labor, equipment, and cost. For example, Waste Management, the largest waste management company in the U.S., tried to separate recyclables and general waste from mixed-box dumpsters and discontinued the process because it wasn't economically feasible.

Another known approach is to separate recyclables at their source to eliminate or reduce the cost of sorting and separating downstream at a MRF. This creates multiple waste streams with accompanying issues of storage, pickup, and delivery to the MRF. This processing approach is typically only practical and implemented at very large construction sites and would not be feasible at typical commercial sites, construction sites or sites of a large home remodeling project. Generally, MRF's specialize or accept only one type of recyclable material so this approach would require multiple roll-off trucks carrying one dumpster at a time to multiple different locations or MRF's, which is not economically feasible.

U.S. Pat. No. 9,573,756 to Bennett et al., discloses a dual waste collection container for collecting both recyclables and non-recyclables at commercial waste sources. This system is one container with two different compartments, one for waste and one for recyclables requiring two separate garbage trucks to go to the source site to dump a relatively small amount of both waste and recyclables. The system has added transportation costs and can accommodate only one recyclable unless recyclables were mixed requiring further separation later. Additionally, this container design could only be implemented on small dumpsters, up to 8 yards. Dumpsters larger than 8 yards are not lifted or dumped in the same manner. Dumpsters larger than 8 yards, referred to as roll-off dumpsters, must utilize a roll-off truck with either a cable hoist or hook lift.

U.S. Pat. No. 11,524,842 to Sridhar discloses a dumpster-style receptacle with multiple openings and compartments (segregation units) for keeping separate various recyclable material streams. A garbage truck must be configured with multiple compartments that match the number of segregation units in the receptacle as well as complementary slots or segments in both the truck and the dumpster for collecting, dumping and loading. Presumably complementary chutes, streams, or storage would be needed at the MRF to unload the special trucks without mixing the materials. This approach requires a lot of new infrastructure and may be costly. This system can separate recyclables but is not feasible at typical sites of large waste generation because there also needs to be a separate large dumpster for trash adding to transportation costs and availability of space for multiple dumpsters. Additionally, most MRF's specialize in one recyclable material and aren't configured to handle multiple types of recyclables.

What is needed is a more cost-effective and efficient system for separating recyclables at the source and handling them at a transfer station, landfill or MRF.

SUMMARY OF THE INVENTION

The present invention is directed to systems and methods which provide a simplified, easy-to-use, and economical recycling system for collecting, sorting, transporting, and unloading multiple types of recyclables, in particular, systems and methods applicable to roll-off dumpsters.

The system includes a number of bins sized and shaped to mirror the inside of the particular roll-off dumpster style they are adapted for. The bins are therefore slightly smaller than the interior dimensions of the roll-off and slightly taller than the roll-off. The bins include lift sites which may be fork channels, fork stirrups, lift rings, or other means of lifting the bins in and out of the dumpster and/or dumping the bins. The lift sites are accessible over or above the top rail of the roll-off. The lift sites are preferably located within the rectangular dimensions of the opening or open top of the bin so that the bins may reside side-by-side with minimal wasted space there between.

The roll-offs and/or the bins may be modified to include bin and/or roll-off location elements to prevent excessive movement of the bins in the roll-off. These bin location elements may be pins or fins, and the roll-off location elements may be complementary holes, or slots, guide protrusions or the like. The bins may include lids, ladders or steps and combinations thereof.

The invention is also directed to the bins themselves.

The invention is also directed to methods utilizing the bins and the roll-offs to collect and transport and dump recyclables.

The systems and methods can be implemented without any significant modifications to or disruptions to existing waste management processes or waste streams, other than producing or obtaining the specially designed bins. The handling of the roll-offs in the waste stream remains the same other than inserting and extracting the bins. The equipment for lifting and dumping the bins is already in existence. The systems and methods have the potential to easily and economically increase recycling and reduce landfill usage.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
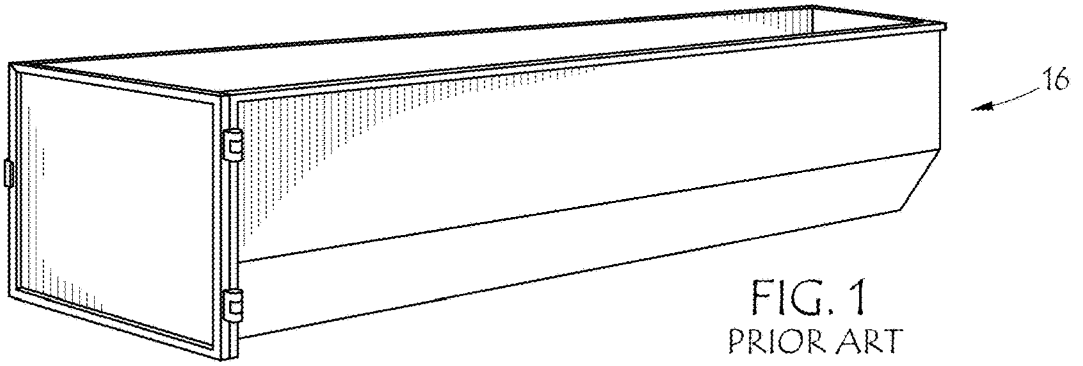
FIG. 1 PRIOR ART
FIG. 1 is a perspective view of a conventional roll-off dumpster.
Figure 2:
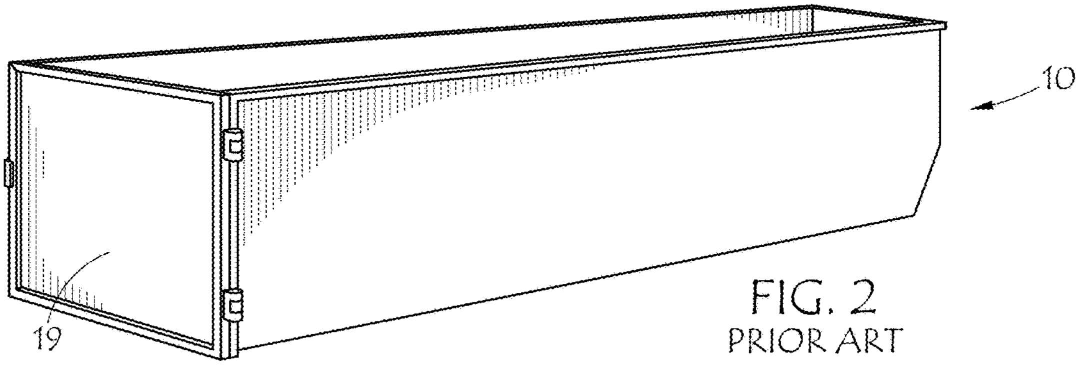
FIG. 2 PRIOR ART
FIG. 2 is a perspective view of another conventional roll-off dumpster.
Figure 3:
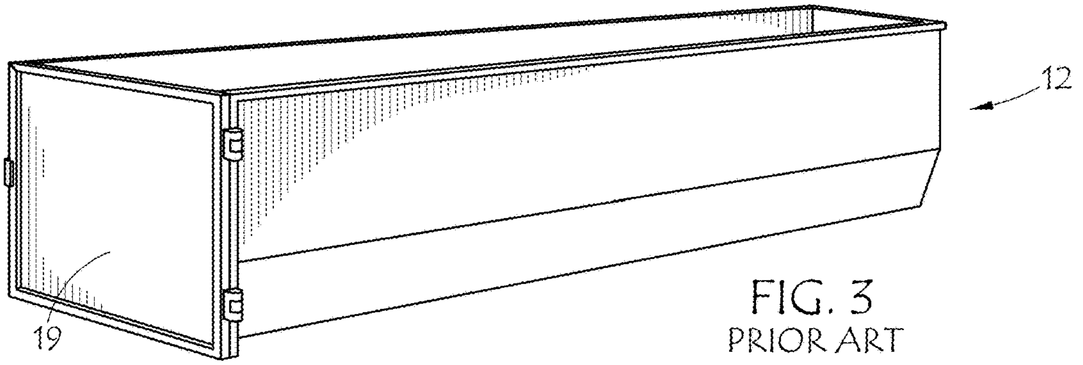
FIG. 3 PRIOR ART
FIG. 3 is a perspective view of another conventional roll-off dumpster.
Figure 4:
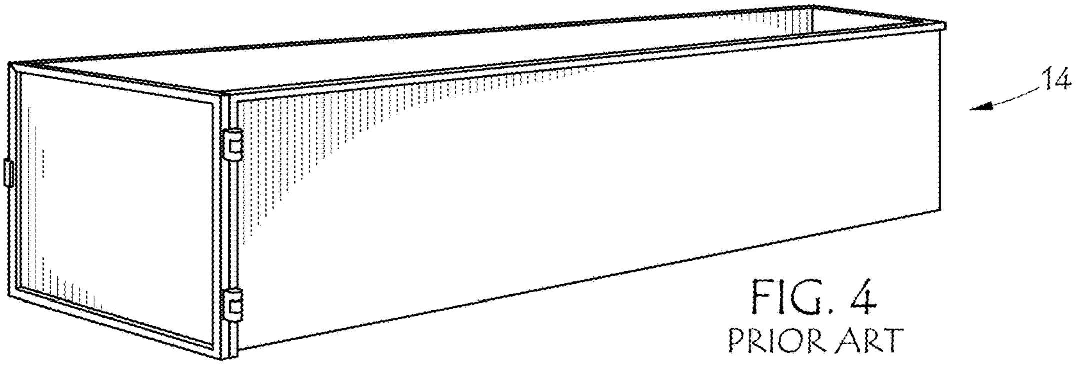
FIG. 4 PRIOR ART
FIG. 4 is a perspective view of another conventional roll-off dumpster.

The inventive system includes a bin, or series of bins, designed to be inserted into and extracted from an existing roll-off dumpster for the purpose of separating recyclable materials from general waste. The bins' shape and dimensions mirror the internal shape and dimensions of the various types of roll-off dumpsters it is placed into in order to maximize the displaced volume of the dumpster. The bin is placed inside a dumpster which may be modified or adapted for locking the bin in place with spring activated plunger pins or other locating or locking elements. The bin or bins can then be filled with recyclable materials and extracted with the use of a front-end loader or other common lifting devices. The bin is adapted to be lifted out of the roll-off dumpster (i.e., extracted) at a landfill or waste transfer station before the general waste in the dumpster is weighed and dumped. Allowing for bin extraction before the general waste is weighed is crucial because waste disposal dumping fees are largely weight based. The bins are designed to be inserted or placed at the front of the dumpster for two reasons. One, to allow for normal loading of the general waste into the dumpster through the opening or door at the rear of the dumpster. Two, to prevent or alleviate pressure or compression on the bin arising from the loading of the general waste into the dumpster. When the dumpster is loaded onto the roll-off truck for transfer, for example, with a cable hoist or hook lift, the general waste contents of the dumpster will shift back towards the rear of the dumpster alleviating pressure on the bin, thus allowing for easier extraction. It should be noted the placement of bins at the front of the roll-off is preferred for aforementioned reasons, however bin placement could be anywhere inside the dumpster. The top of each bin is specially designed to include lifting points, preferably fork channels for bin insertion and extraction using front-end loader forks. The bin-mounted fork channels are above the top line or rail of the dumpster to allow for fork insertion.

The front-end loader ("FEL") used may be a modification to a front-end loader that is commonly used on existing industry-standard waste removal vehicles. The modifications of the front-end loader would be designed to make insertion and extraction of the bins, into and out of the dumpster, easier and more efficient. Examples of potential modifications are the size and shape of the FEL forks, allowing the width between the forks to be easily adjustable to accommodate different sized bins, and modifying how the FEL itself is mounted. The front-end loader can be stationary or mounted on a truck or tractor depending on where in the dumping cycle the bin will be extracted and the desired location and placement of recyclables. It should be noted that the invention could use a standard front-end loader trash truck that already has width-adjustable forks for extraction of the bins at a transfer station or landfill, requiring no modifications at these sites to accommodate the invention.

The bins may be sized to a desired fraction or percentage of the total roll-off. As non-limiting examples, they could be 10% or 20% of the volume of the dumpster for which it is placed into. The bins can be used in a modular fashion for further separation of recyclable materials, picking and choosing sizes to best accommodate the type and volume of recyclables expected.

For example, two or three 10% bins could be used to separate two or three different types of recyclables. For example, there could be one for cardboard, one for metal, one for wood. As another example, a single 20% bin could be used for mingled recyclable materials with further separation of materials after extraction.

Currently, roll-off dumpsters are filled with general waste and materials that can be recycled, all mixed together with no separation. There is no sorting for recyclable materials and the entire contents of the dumpster, including recyclable materials, end up in the landfill. The bins therefore serve as both a means to recycle and a means for waste diversion from landfills. The system is easy and economically feasible to implement with very minor modifications to the current process. The various conventional methods require huge infrastructure changes and costs and simply aren't being used. The bins themselves can be easily made by manufacturers that are already manufacturing other dumpsters or bins, utilizing new molds. Existing roll-off dumpsters can be used with no modification, or they can be easily modified as described herein for better compatibility with the bins. These methods will not disrupt current waste streams, other than perhaps acquiring a suitable front-end loader for the transfer station or landfill for extracting and dumping the bins. The inventive system could realistically be implemented and be expected to recycle and/or divert millions of tons of materials that currently go directly into landfills each year.

Figure 5:
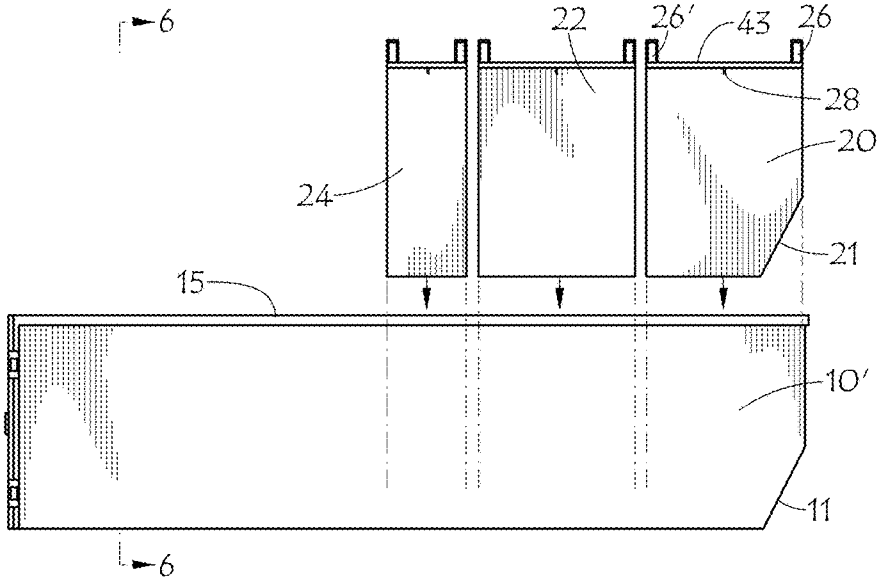
FIG. 5 is a side elevation view of an embodiment of the invention.
Figure 6:
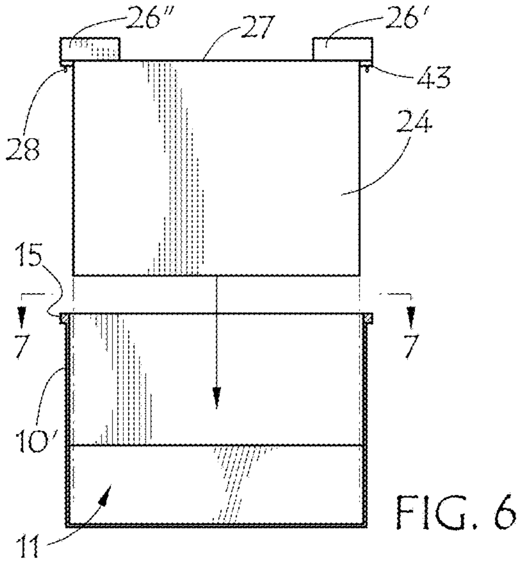
FIG. 6 is a sectional rear view of the embodiment of FIG. 5.
Figure 7:
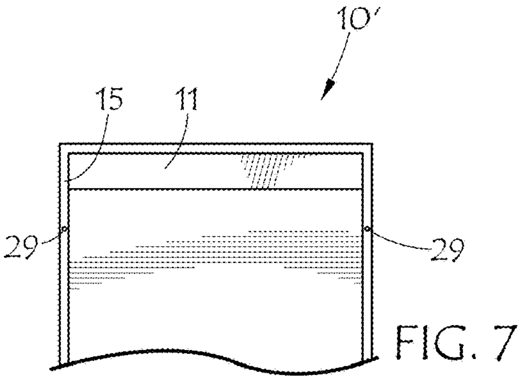
FIG. 7 is a partially fragmented top view of the embodiment of FIG. 6.

FIGS. 1-4 illustrate the most common shapes of roll-offs. FIGS. 5-7 illustrates a system based on the dumpster 10' which is the dumpster of FIG. 2 with angled front 11, but modified for use in the inventive system. It should be understood that any conventional roll-off dumpster can be used in the inventive system. Many different shapes may be used, but all are basically rectangular with consistent widths (generally eight feet), some with beveled-bottom sides and/or fronts, angled or rounded corners, or an inward protrusion at the front.

The system is shown in FIG. 5 having three bins 20, 22, 24. Each bin has a rail or top edge 43 which rides on or sits above the dumpster top rail 15 and may have a locating pin 28 which engages in a complementary hole 29 in the top rail 15 of the dumpster 10' as shown in FIG. 7. Each bin may have a pair of fork channels 26, 26' mounted above the width-wise top edge 27, so that it will have accessible lift sites when the bin is sitting in the dumpster. To be clear, the sides of the bin that define the width of the bin have the lift sites on the top edges 27 thereof, which in this case are fork channels 26, 26'.

The first bin 20, in FIG. 5, has an angled front 21 in order to fit neatly at the angled front 11 of the dumpster 10'. The second and third bins 22 and 24 are just rectangular to maximize volume usage. The first two bins shown are approximately 20% bins, i.e., taking up or holding about 20% of the total internal dumpster volume. The third bin shown is approximately a 10% bin, i.e., taking up or holding about 10% of the dumpster volume. So, the three bins together occupy about half the dumpster volume.

Figure 8:
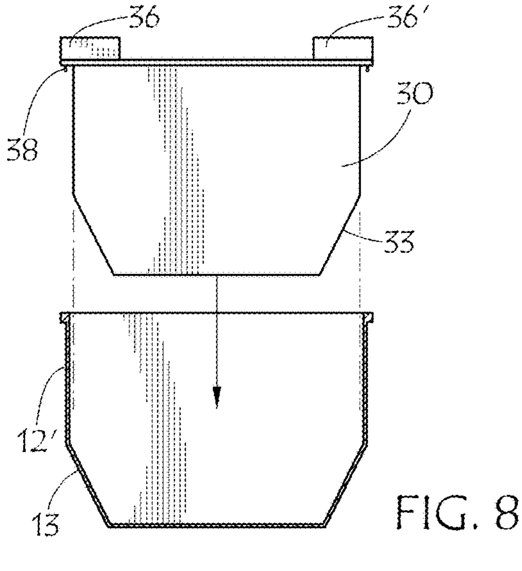
FIG. 8 is a sectional rear view of another embodiment of the invention.

FIG. 8 illustrates an alternate shape for bin 30, i.e., angled sides 33 designed to fit neatly in modified dumpster 12' having angled sides 13. Bin 30 again has fork channels 36 and 36' for lifting, and locating pins 38 pointing downward to engage with complementary holes (not shown) in the dumpster top rail. In the embodiments of FIG. 6 and FIG. 8, the fork channels are minimally sized and located on both sides of the bin, for access by a FEL or fork lift from either side of the dumpster.

Figure 9:
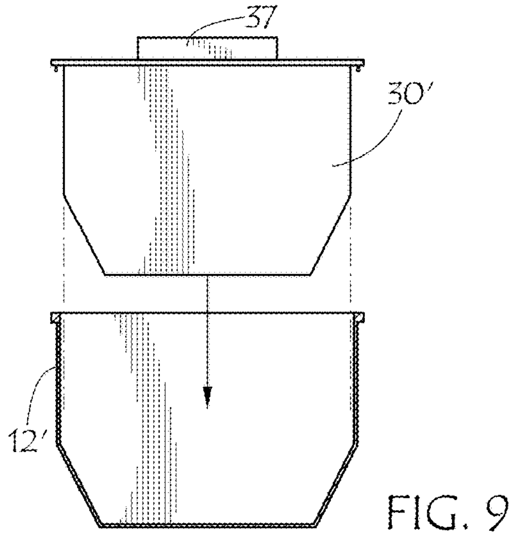
FIG. 9 is a sectional rear view of another embodiment of the invention.

FIG. 9 illustrates bin 30' with the same shape as bin 30, but with a different fork channel 37. Fork channel 37 is longer than channels 36, 36', 26' or 26" and is located more centrally with respect to the width of the bin. Fork channels 37 are on front and back of the bin and can be reached from either side of the dumpster due to their central location and their length.

Figure 10:
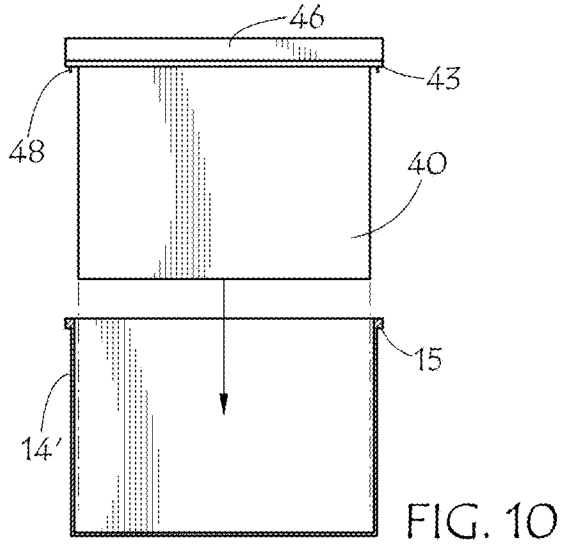
FIG. 10 is a sectional rear view of another embodiment of the invention.

FIG. 10 illustrates a rectangular roll-off 14' modified as the previous two, with holes in top rail 15 to accommodate locating pins 48 on top edge 43 of bin 40. Bin 40 has front and back full-width fork channels 46.

Figure 11:
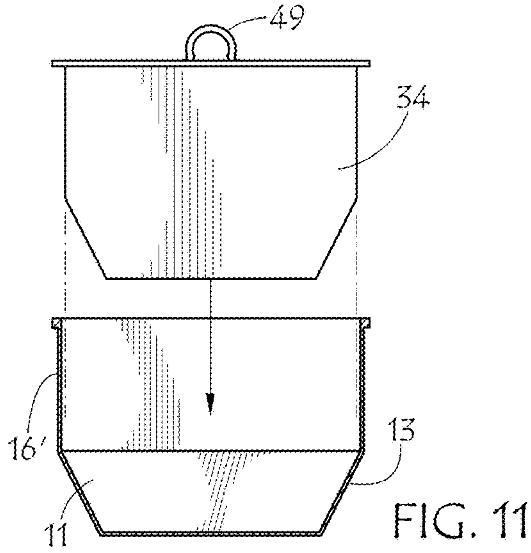
FIG. 11 is a sectional rear view of another embodiment of the invention.
Figure 25:
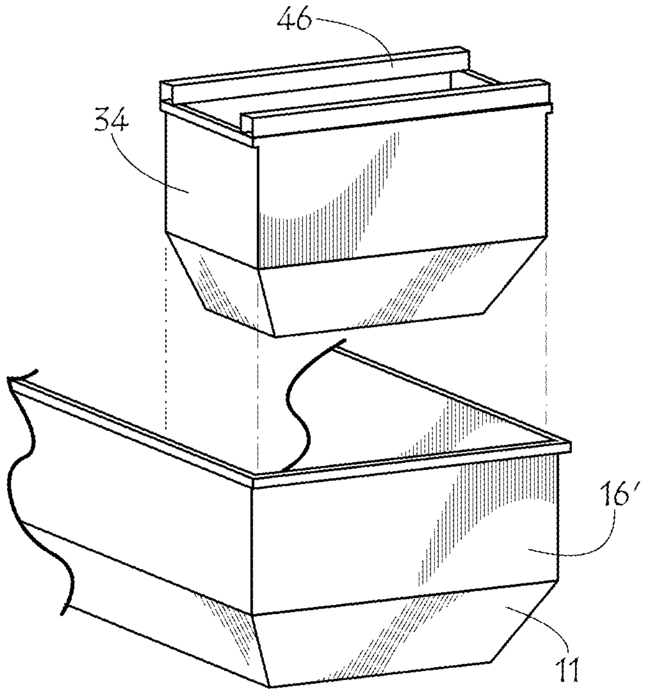
FIG. 25 is a partially fragmented front perspective view of a similar embodiment to that of FIG. 11.

FIG. 11 illustrates a modified roll-off 16' with angled sides 13 and front 11. Bin 34 is shaped in a complementary way to fit neatly in the roll-off 16'. The lift points for bin 34 are rings 49 for lifting with a hook, for example a hook on a hoist or pair of hooks on a chain which can be lifted with a hoist or fork lift. FIG. 25 shows a front perspective view of bin 34 (except bin 34 in FIG. 25 has fork channels 46, not rings) adapted to fit the front of roll-off 16', i.e. with angled sides and front. For a system for roll-off 16', the first bin could be shaped like bin 34 with both front and sides angled, and any additional bins could be shaped like bin 30 with only the sides angled.

Figure 12:
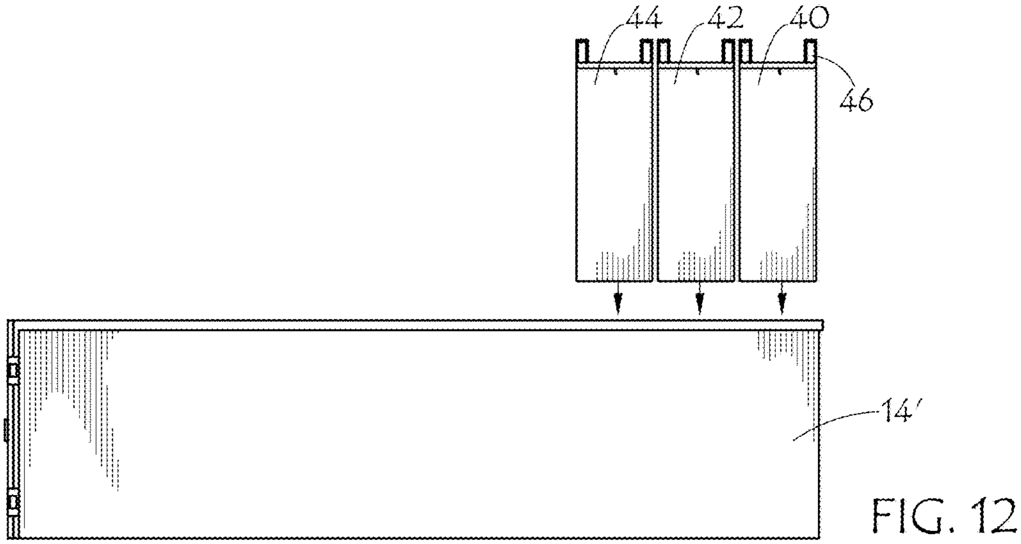
FIG. 12 is a side elevation view of another embodiment of the invention.
Figure 13:
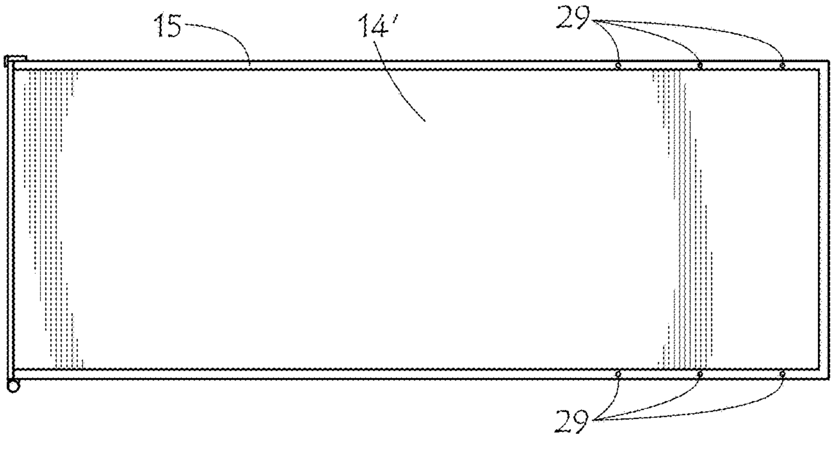
FIG. 13 is a top view of a dumpster modified according to the embodiment of FIG. 12.

The system embodiment of FIG. 12 is based on modified rectangular roll-off 14' and three complementary rectangular bins 40, 42, and 44 with fork channels 46. Bins 40, 42, and 44 are sized as approximately 10% bins. FIG. 13 shows pin locating holes 29 on top rail 15 of roll-off 14'.

Figure 14:
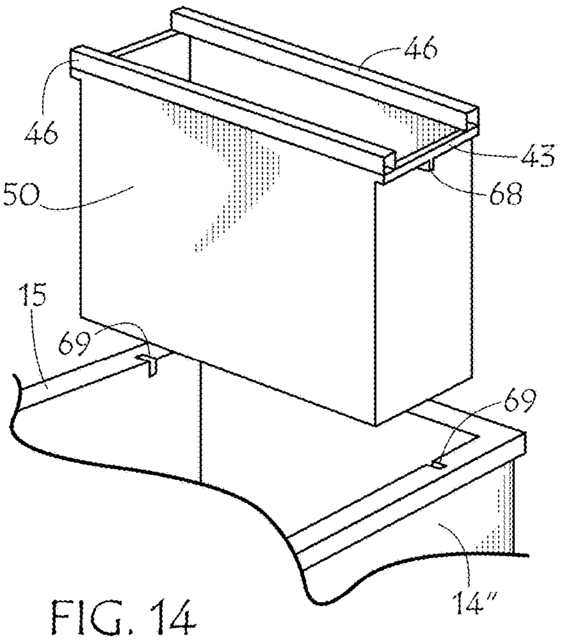
FIG. 14 is a partially fragmented view of another embodiment of the invention.
Figure 15:
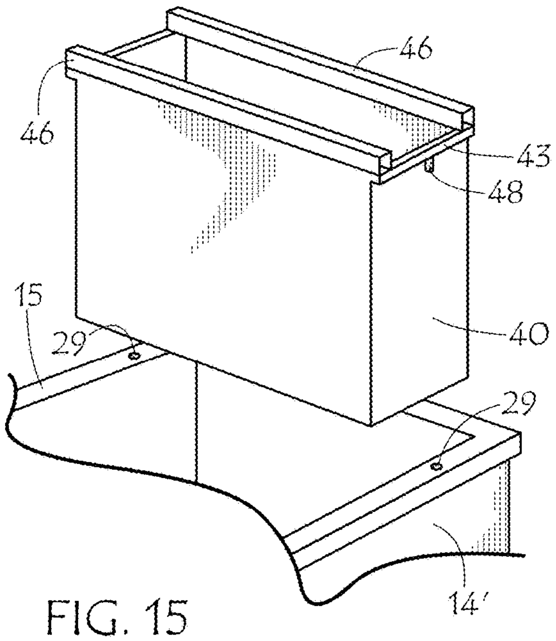
FIG. 15 is a partially fragmented view of another embodiment of the invention.
Figure 16:
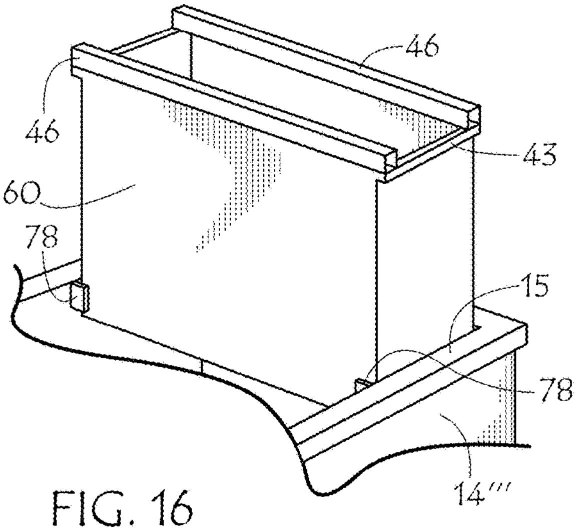
FIG. 16 is a partially fragmented view of another embodiment of the invention.

FIGS. 14 to 16 show some alternative locating methods for the bins inside the roll-offs. FIG. 15 is a partial perspective view of the embodiment of FIGS. 12 and 13. Locating pin 48 on bin edge or lip 43 engages hole 29 on top rail 15. The style of fork channels illustrated is full width channels 46. FIG. 14 shows bin 50 with similar fork channels 46 and lip 43, but with a locating protrusion or fin 68 which engages slot 69 on top rail 15 of bin 14". FIG. 16 shows bin 60 with similar shape, fork channels, and edge, but no locating feature on the bin. Bin 60 is located and held in place by fins 78 attached to an inside wall or the top rail of roll-off 14'".

Figure 17:
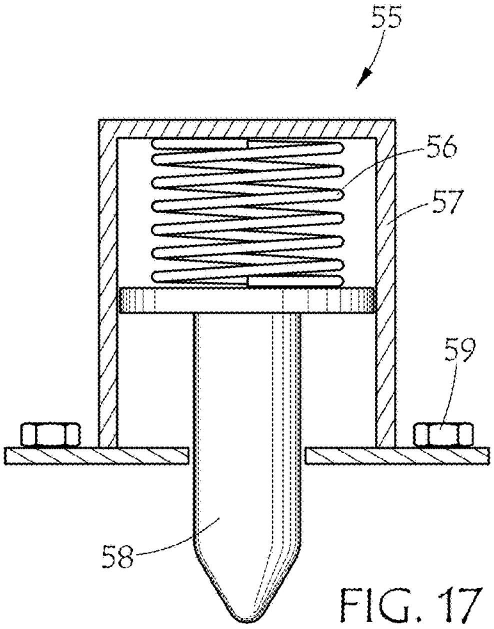
FIG. 17 is a partially fragmented sectional view of a pin feature for an embodiment of the invention.

FIG. 17 shows an exemplary retractable, spring-loaded pin 55 which could be bolted to a bin with fastener 59. Pin 58 is biased or activated by spring 56 contained in housing 57.

Figure 18:
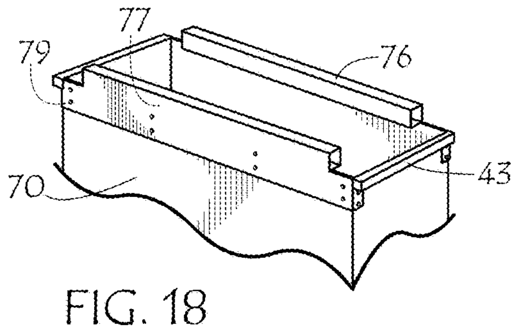
FIG. 18 is a partially fragmented perspective view of a bin according to an embodiment of the invention.
Figure 19:
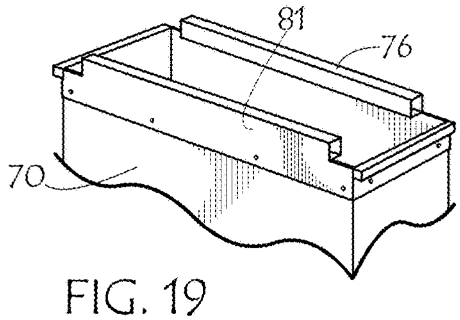
FIG. 19 is a partially fragmented perspective view of a bin according to another embodiment of the invention.

The bins described could be of unitary construction, molded from plastic, such as polyethylene or polypropylene, or fabricated from steel, aluminum, composite, or other suitable metals or materials. The bins could include drain holes (which could also be threaded and/or have plugs) to prevent standing water or leakage. FIGS. 18 and 19 show some hybrid constructions where the fork channels are attached to the bin by various means. These are not meant to be limiting but suggestive of various ways the bins or fork channels could be constructed. In FIG. 18, bin 70 has the fork channels 76 attached to mounting plate 77 which is bolted onto bin 70 with fasteners 79 along the top edges of the bin. The fork channel material could be steel while the bin material could be plastic. In FIG. 19, fork channels 76 are on mounting plate 81 which wraps all the way around the perimeter of the top edge of bin 70 and may also include fasteners.

Figure 20:
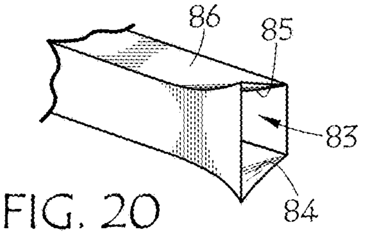
FIG. 20 is a partially fragmented perspective view of a fork channel feature for an embodiment of the invention.

FIG. 20 illustrates a fork channel 86 with flared top surface 85 and bottom surface 84 at its open end 83. This makes inserting forks easier. This feature may be applied to any of the fork channels or embodiments described herein. It should be noted that the fork channels described herein may also be called fork tubes, fork tunnels, fork sleeves, or fork pockets in the art. Fork stirrups may be used for lifting as well, although fork channels are believed to be more stable for lifting and dumping the contents out of the bins.

The drawings show a preferable arrangement of the fork channels as lift sites on the bins. In particular, the fork channels do not stick out horizontally from the top of the bin but are contained within the rectangular extent of the open top of the bin or the bin opening. Therefore, two or more bins would fit adjacent to each other with minimal or no wasted space between them, i.e., no interference between the fork channels of adjacent bins. This would be most preferable for the modular application of multiple bins.

Figure 21:
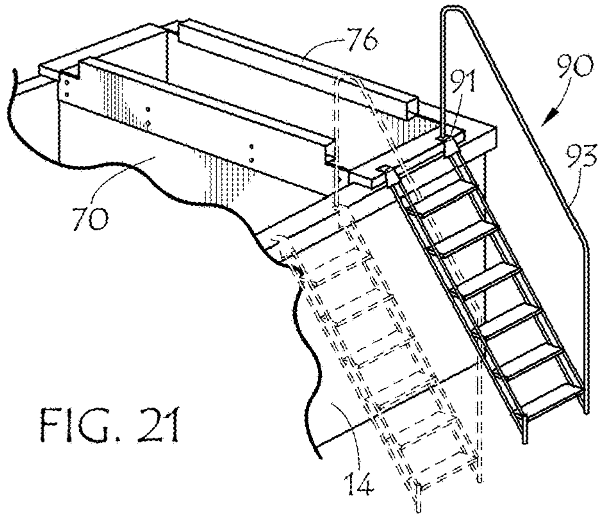
FIG. 21 is a partially fragmented perspective view of a ladder feature for an embodiment of the invention.
Figure 22:
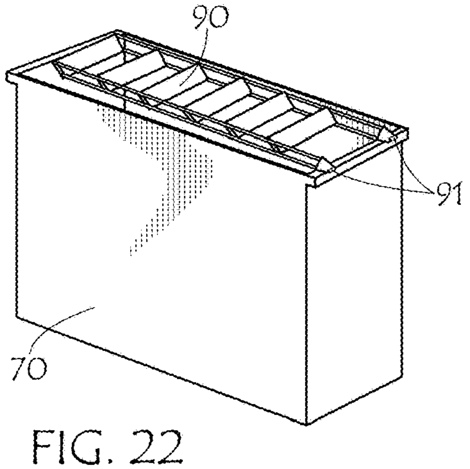
FIG. 22 shows the ladder feature of FIG. 21 in a different position.
Figure 23:
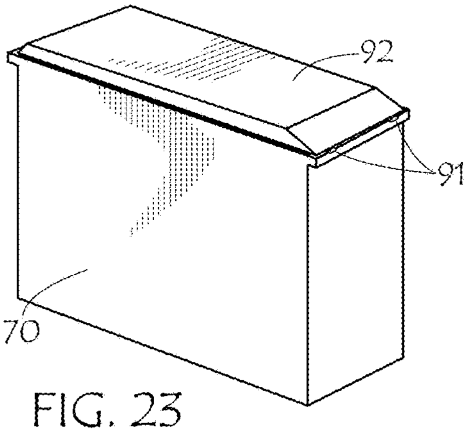
FIG. 23 shows a lid feature for an embodiment of the invention.
Figure 24:
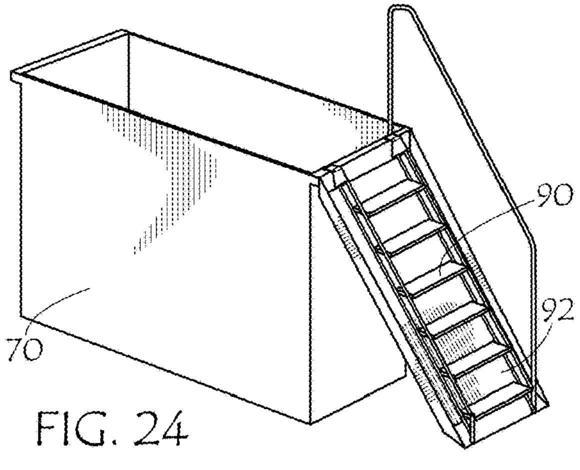
FIG. 24 shows a combination bin plus ladder and lid feature for an embodiment of the invention.

In the embodiment of FIGS. 21 and 22, ladder or stairs 90 may be movably attached to the top edge of bin 70 (or any of the other bin embodiments described herein). Attachment points 91 could be permanent hinges or temporary attachment points that allow for easily moving the ladder or stairs to other positions along the dumpster, as shown in FIG. 21. The ladder or stairs 90 may include a handrail 93. Preferably the angle of the steps is more like stairs than a ladder to make it easier and safer to climb carrying recyclable materials to be tossed into the bin without requiring hands. FIG. 22 illustrates how ladder or stairs 90 could be folded up on top of bin 70 when not in use or during transport. Handrail 93 can be adapted to fold as well. FIG. 23 illustrates that bin 70 could include lid 92 with hinges 91, for example. FIG. 24 illustrates bin 70 with a combination of lid 92 and ladder or stairs 90 which would resemble FIG. 23 when closed.

It should also be noted that FIG. 21 illustrates that the bins have a width less than the width of the roll-off dumpster and a height that is greater than the inside height of the dumpster, so the fork channels are accessible above the top rail of the roll-off and the bins are thus adapted to fit neatly into the roll-off dumpster. This applies to all the embodiments.

Data from the EPA on landfill materials in 2020 indicates that of the 140 million tons landfilled that year, 22% was food, 19% was plastics, 13% was paper/cardboard, 10% was metals and 9% was wood. If the inventive system was put to widespread use with four 10% bins for plastics, paper/cardboard, metals and wood, respectively, recycling of these materials could rapidly and significantly reduce the amounts of recyclables sent to landfills. A 20% bin for plastics and 10% bins each for paper/cardboard and metals, may be close to optimum for some typical waste sources that currently mix everything together in roll-offs with no separation and are landfilled. A 20% bin for paper/cardboard plastics and 10% bin each for metals and wood may be close to optimum for some typical construction or remodeling waste sources. If the waste source includes food or other organics, this system is adaptable to include a suitably sized food bin for composting. The impact on recycling rates versus landfilling could be immediate and significant. The EPA also suggests that increasing recycling rates will have a significant impact on greenhouse gas emissions and therefore help in the battle against climate change. When cardboard, paper and other organics decompose in a landfill, it releases methane, a greenhouse gas that's 20 times more potent than carbon dioxide. The production of cardboard and paper also uses large amounts of water and energy, and using virgin wood pulp contributes to deforestation. Piles of cardboard and paper littering America's landfills represent $4 billion in lost economic value, according to a new analysis by researchers at the U.S. Department of Energy's National Renewable Energy Laboratory (NREL).

The 30-yd dumpster (i.e., 30 cubic yards) is the most commonly used dumpster at large waste sources and is fairly uniform in dimensions. Therefore, the inventive system could be implemented for this roll-off size with a few standard bin sizes and shapes. Nevertheless, the invention could be applied to any desired roll-off size, such as 20-, 30-, 40-yd dumpsters or any other smaller or larger size. The modular nature of the bins suggests a series of standard sizes that could be selected from to create a roll-off system customized for any waste source or recycling project. For example, bins could be sized for 10%, 12%, 15%, and 20% of a given total internal roll-off volume. Of course, any other desired combination of sizes could be made in order to better match the expected amounts of recyclables. A convenient way to size the bins is to make them each a multiple of a predetermined percentage of the total roll-off dumpster's internal volume. For example, the predetermined percentage could be 5%, with integer multiples thereof leading to bins with internal volumes of 5%, 10%, 15%, 20%, 25% and so on, of the roll-off volume. The tolerance could be within about 2.5%, allowing for intermediate-sized bins within the same design approach. The end user could then select the combination of sizes needed for their expected stream of recyclables.

The location of the fork channels or other lifting sites on the bins has several advantages. The bins can be lifted out or placed in from either side of the roll-off dumpster. The bins can be lifted out or placed in while the roll-off is still on its transport vehicle, or while the roll-off is on the ground. Individual bins, as well as the dumpster itself, can easily be weighed or tared for weighing the contents therein. For that matter, the bins could be lifted out at the waste generation site and dumped into a collection truck for recyclables only, and then replaced into the roll-off, thus facilitating collection of recyclables at the source.

The invention is also directed to a method of recycling utilizing any number of any embodiment of the aforementioned bins. Such a method would include providing a plurality of bins adapted to fit neatly into the front portion of a roll-off dumpster, each bin having one or more lift sites as described above. The bins would be lifted and placed into a roll-off dumpster, which could then be transported to a waste source or generation site where the system would be put into service collecting various recyclables in the various bins and general landfill waste in the remaining portion of the roll-off dumpster. The system would finally be delivered to a waste handling, transfer, or collection site where the individual bins could be extracted from the roll-off and dumped. The extraction would preferably utilize a front-end loader, because of its ability to lift or extract the bin and dump its contents in one fluid motion or step for further processing of the recyclables. The roll-off itself could also be weighed and dumped at this point which is typical of the current waste stream process.

As described above, the lift sites could be fork channels mounted on and parallel to top edges of the bins. The bins would generally have a rectangular opening at the top, and the fork channels would be mounted so that they do not extend horizontally outside said rectangular opening in order to minimize the space wasted between adjacent bins in the roll-off. The lift sites could be rings or eyelets or fork channels or fork stirrups. The extraction could be by front-end loader, forklift, crane or hoist, for example, depending on the lift site design. The bins and/or the roll-off dumpster may have bin-location elements adapted to prevent movement of the bin in the roll-off dumpster, as described herein. Movement would be most likely when the roll-off only has bins in it and is otherwise empty. Since loading the roll-off with trash will keep the bins from moving, the bin location elements are optional.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A waste collection system for recycling comprising a plurality of bins and a roll-off dumpster; said bins sized and shaped to mirror a portion of the inside of the roll-off dumpster, said roll-off dumpster having an inside width of about eight feet, an inside height, a length, and a total internal volume greater than eight cubic yards; said bins adapted to fit neatly into the roll-off dumpster; and each bin comprising one or more lift sites and a bin width slightly less than the inside width of the roll-off dumpster.

2. The waste collection system of claim 1 wherein the bins have a bin length that is a fraction of the length of the roll-off dumpster, and a bin height that is greater than the inside height of the dumpster, and adapted to fit neatly into the roll-off dumpster with the lift sites protruding above the roll-off dumpster.

3. The waste collection system of claim 1 wherein each bin has a rectangular, open top and wherein each of two sides defining the bin width of each bin have one of the one or more lift sites mounted on a top edge thereof.

4. The waste collection system of claim 3 wherein the two lift sites each comprise a fork channel mounted parallel to and above said top edge.

5. The waste collection system of claim 4 wherein the fork channels are mounted so that they do not extend horizontally outside said rectangular, open top.

6. The waste collection system of claim 1 wherein each bin has an internal volume which is a predetermined percentage, respectively, of the total internal volume of the roll-off dumpster.

7. The waste collection system of claim 6 wherein each said predetermined percentage is an integer multiple of 5% plus or minus about 2.5%.

8. The waste collection system of claim 7 comprising three said bins wherein the respective percentages are 10%, 10%, and 20%.

9. The waste collection system of claim 1 wherein said bins comprise bin location elements adapted to prevent movement of the bins in the roll-off dumpster.

10. The waste collection system of claim 1 wherein the roll-off dumpster is modified to include roll-off location elements adapted to prevent movement of the bins in the roll-off dumpster.

11. The waste collection system of claim 10 wherein said bins comprise bin location elements adapted to engage the roll-off location elements and prevent movement of the bins in the roll-off dumpster.

12. The waste collection system of claim 11 wherein the bin location elements comprise pins pointing downward from side edges of the open top of the bin, and the roll-off location elements comprise holes in a top rail of the roll-off dumpster.

13. A bin for recyclables comprising one or more lift sites, the bin adapted, sized, and shaped to mirror a portion of and to fit neatly into and to be used in conjunction with a conventional roll-off dumpster defined as a roll-off dumpster having an inside width of about eight feet, a length, an inside height, and a volume greater than eight cubic yards;

wherein the bin has a bin width slightly less than the inside width, a bin length that is less than the length, and a bin height that is greater than the inside height; and wherein the one or more lift sites are adapted to protrude above and be accessible for inserting and extracting the bin from such a roll-off dumpster and thus provide a way to isolate recyclables therein.

14. The bin of claim 13 further comprising a rectangular, open top; wherein each of two sides defining the width of the bin have one of the one or more lift sites mounted on a top edge thereof, and wherein the two lift sites each comprise a fork channel mounted parallel to and above said top edge.

15. The bin of claim 14 wherein the fork channels are mounted so that they do not extend horizontally outside said rectangular, open top.

16. A waste collection system comprising one or more said bin according to claim 13 and further comprising a conventional roll-off dumpster as defined in claim 13, wherein the nominal volume of the roll-off dumpster is greater than or equal to about 10 cubic yards.

17. A method comprising:

providing a bin or a plurality of bins sized and shaped to mirror a portion of the inside of a conventional roll-off dumpster, said roll-off dumpster having a width of about eight feet, an inside height, a length, and a total internal volume greater than eight cubic yards, wherein the bin or bins have a width slightly less than the inside width of the roll-off dumpster, a length that is less than the length of the roll-off dumpster, and a height that is greater than the inside height of the roll-off dumpster, thus adapted to fit neatly into the roll-off dumpster, each said bin or bins comprising one or more lift sites protruding above the roll-off dumpster;

lifting said bin or bins and placing them into said roll-off dumpster;

allowing said bin or bins to have recyclables placed therein at a waste generation site;

delivering said roll-off dumpster with said bin or bins therein and said recyclables therein to a waste collection or recycling site; and extracting said bin or bins from said roll-off dumpster for dumping and further processing of said recyclables.

18. The method of claim 17 wherein said lift sites comprise fork channels mounted on and parallel to top edges of said bin or bins.

19. The method of claim 18 wherein each said bin or bins has a rectangular, open top; and wherein the fork channels are mounted so that they do not extend horizontally outside said rectangular opening.

20. The method of claim 18 wherein one or both of said bin or bins and said roll-off dumpster comprise bin location elements adapted to prevent movement of the bin or bins in the roll-off dumpster.

* * * * *